(12) United States Patent
Li et al.

(10) Patent No.: US 11,199,686 B2
(45) Date of Patent: Dec. 14, 2021

(54) WIDE-ANGLE LENS AND PANORAMIC IMAGING SYSTEM INCLUDING SEVEN LENSES OF -+-++ REFRACTIVE POWERS AND A REFLECTIVE ELEMENT

(71) Applicant: JIANGXI LIANCHUANG ELECTRONIC CO., LTD., Nanchang (CN)

(72) Inventors: Weina Li, Nanchang (CN); Bo Gao, Nanchang (CN); Jian Han, Nanchang (CN); Jiyong Zeng, Nanchang (CN)

(73) Assignee: JIANGXI LIANCHUANG ELECTRONIC CO., LTD., Nanchang (CN)

( * ) Notice: Subject to any disclaimer, the term of this patent is extended or adjusted under 35 U.S.C. 154(b) by 582 days.

(21) Appl. No.: 16/322,105

(22) PCT Filed: Nov. 14, 2018

(86) PCT No.: PCT/CN2018/115318
§ 371 (c)(1),
(2) Date: Jan. 30, 2019

(87) PCT Pub. No.: WO2020/062477
PCT Pub. Date: Apr. 2, 2020

(65) Prior Publication Data
US 2021/0356719 A1   Nov. 18, 2021

(30) Foreign Application Priority Data

Sep. 30, 2018  (CN) .......................... 201811156472.0

(51) Int. Cl.
*G02B 13/06* (2006.01)
*G02B 9/64* (2006.01)
*G02B 13/00* (2006.01)

(52) U.S. Cl.
CPC .............. *G02B 13/06* (2013.01); *G02B 9/64* (2013.01); *G02B 13/006* (2013.01); *G02B 13/0045* (2013.01); *G02B 13/0065* (2013.01)

(58) Field of Classification Search
CPC ...... G02B 13/06; G02B 9/64; G02B 13/0045; G02B 13/006; G02B 13/0065
See application file for complete search history.

(56) References Cited

U.S. PATENT DOCUMENTS

2018/0039049 A1   2/2018 Lee et al.

FOREIGN PATENT DOCUMENTS

| CN | 103703403 A | 4/2014 |
| CN | 105527695 A | 4/2016 |

(Continued)

OTHER PUBLICATIONS

First Office Action issued in corresponding Chinese application No. 201811156472.0, dated Nov. 16, 2019 (16 pages.

(Continued)

*Primary Examiner* — Wen Huang (57) ABSTRACT

A wide-angle lens in the following order from an object side toward an image plane includes: a first lens, a second lens, a third lens, a fourth lens, a fifth lens, a sixth lens, a seventh lens, an optical reflecting member, and an optical filter. The first lens has negative refractive power and a concave image side surface. The second lens has negative refractive power and a concave image side surface. The third lens has positive refractive power. The fourth lens has positive refractive power and a concave image side surface. The fifth lens has negative refractive power, a concave object side surface, and a concave image side surface. The sixth lens has positive refractive power, a convex object side surface, and a convex image side surface. The seventh lens has positive refractive power, a convex object side surface, and a convex image (Continued)

side surface. Each of the first lens and the third lens is a spherical lens. One of the second lens and the fourth lens is an aspherical lens, and the other one of the second lens and the fourth lens is a spherical lens. Each of the fifth lens and the sixth lens is spherical lens. The fifth lens and the sixth lens form a cemented lens. The seventh lens is an aspherical lens. A panoramic imaging system is also provided.

20 Claims, 10 Drawing Sheets

(56) References Cited

FOREIGN PATENT DOCUMENTS

| CN | 105530415 A | 4/2016 |
|---|---|---|
| CN | 105759404 A | 7/2016 |
| CN | 105467660 B | 12/2017 |
| CN | 107621681 A | 1/2018 |
| CN | 108051978 A | 5/2018 |
| CN | 207352664 U | 5/2018 |
| CN | 108267834 A | 7/2018 |
| CN | 108427173 A | 8/2018 |

OTHER PUBLICATIONS

Notification to Grant Patent Right for invention issued in corresponding Chinese application No. 201811156472.0, dated Oct. 31, 2019 (7 pages).
International Search Report issued in corresponding International application No. PCT/CN2018/115318, dated Jul. 8, 2019 (7 pages).
Written Opinion of the International Searching Authority in corresponding International application No. PCT/CN2018/115318, dated Jul. 8, 2019 (4 pages).

WIDE-ANGLE LENS AND PANORAMIC IMAGING SYSTEM INCLUDING SEVEN LENSES OF -+-++ REFRACTIVE POWERS AND A REFLECTIVE ELEMENT

CROSS-REFERENCE TO RELATED APPLICATION

This application claims priority to a Chinese patent application No. 2018111564720, titled "WIDE-ANGLE LENS AND PANORAMIC IMAGING SYSTEM" and filed on Sep. 30, 2018. The entirety of the above-mentioned application is hereby incorporated by reference herein.

TECHNICAL FIELD

The present disclosure relates to an optical lens technology, in particular to a wide-angle lens and a panoramic imaging system.

BACKGROUND

With the continuous improvement of the requirements of the panoramic imaging system in the market environment, the panoramic high-definition photographing lens becomes more and more diversified. Until now, a 360-degree panoramic high-definition camera has entered the market just for a short time and still has much space to be developed. Meanwhile, the panoramic imaging system on the market often adopts one or more spherical lenses, thus the high-order aberration cannot be well corrected. A non-blind-area wide-angle lens may be provided. Although the field angle of the non-blind-area wide-angle lens reaches 270 degrees, it still can not meet the requirement of the panoramic photographing. A non-blind-area wide-angle lens is also low in image resolving quality, high in processing difficulty, and is not suitable for the current market environment.

In order to meet the use requirements of all photography enthusiasts, the outdoor travel photographing, the diving photographing, the exploration photographing, the architecture photographing, it is necessary to provide a high-quality wide-angle lens and the panoramic imaging system, which may well correct the high-order aberration.

SUMMARY

The present disclosure aims to overcome the defects in the prior art and provides a wide-angle lens and a panoramic imaging system, so that the high-order aberration can be effectively corrected, and the field angle is large.

According to the first aspect of the disclosure, the wide-angle lens in the following order from an object side toward an image plane includes: a first lens, a second lens, a third lens, a fourth lens, a fifth lens, a sixth lens, a seventh lens, an optical reflecting member, and an optical filter. The first lens has negative refractive power and a concave image side surface. The second lens has negative refractive power and a concave image side surface. The third lens has positive refractive power. The fourth lens has positive refractive power and a concave image side surface. The fifth lens has negative refractive power. The fifth lens has a concave object side surface, and a concave image side surface. The sixth lens has positive refractive power. The sixth lens has a convex object side surface, and a convex image side surface. The seventh lens has positive refractive power, a convex object side surface, and a convex image side surface. Each of the first lens and the third lens is a spherical lens. One of the second lens and the fourth lens is an aspherical lens, and the other one of the second lens and the fourth lens is a spherical lens. Each of the fifth lens and the sixth lens is a spherical lens. The fifth lens and the sixth lens form a cemented lens. The seventh lens is an aspherical lens. The optical reflecting member is arranged between the second lens and the third lens. The optical filter is arranged between the seventh lens and the image side.

According to the second aspect of the disclosure, a panoramic imaging system is provided. The panoramic imaging system includes two-wide-angle lenses of the first aspect of the disclosure, the two wide-angle lenses are central symmetrically arranged about a center of the panoramic imaging system, and the image planes of the two wide-angle lenses are central symmetrically arranged.

Compared with the prior art, the wide-angle lens provided by the embodiment of the disclosure adopts five spherical lenses, two aspherical lenses and one optical reflecting member. The lenses and the optical reflecting are matched in a predetermined order, particularly, an aspherical lens is arranged in a predetermined location, so that the high-order aberration of the wide-angle lens may be effectively corrected. The field of view reaches more than 190 degrees, and meanwhile, the processing difficulty and the cost of the wide-angle lens are reduced. The panoramic imaging system provided by the embodiment of the disclosure comprises two wide-angle lenses arranged central symmetrically. The total length of a front optical path before the optical reflecting member is small. The overall optical length of the combined wide-angle lenses is small. The panoramic image system with small size and thin lenses meet the requirements of the market.

BRIEF DESCRIPTION OF THE DRAWINGS

In order to more clearly illustrate the technical solutions in the embodiments of the present disclosure, the accompanying drawings required to be used in the embodiments are introduced briefly in the following.

The following detailed description is further described with reference to the accompanying drawings.

DETAILED DESCRIPTION OF PREFERRED EMBODIMENTS

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

A wide-angle lens and a panoramic imaging system of the embodiment of the present disclosure will be described in detail with attached drawings.

A First Embodiment

Figure 1:
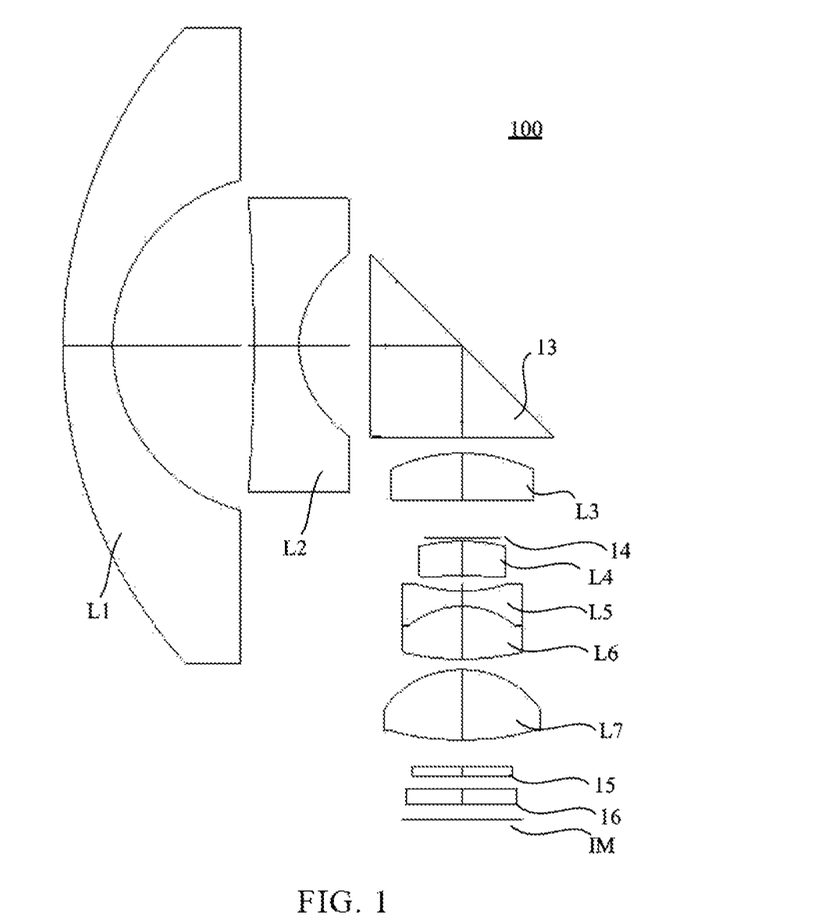
FIG. 1 illustrates a schematic structural diagram of a wide-angle lens according to a first embodiment of the present disclosure.

FIG. 1 illustrates a schematic structural diagram of a wide-angle lens according to a first embodiment of the present disclosure. The wide-angle lens 100 sequentially from an object side to an imaging surface IM includes: a first lens L1, a second lens L2, a third lens 13, a fourth lens L4, a fifth lens L5, a sixth lens L6, a seventh lens L7, and an optical reflecting member 13.

The first lens L1 has negative refractive power, and an image side surface Si of the first lens L1 is concave. The first lens L1 is a spherical lens with a crescent shape. The first lens L1 may adopt a glass lens with relatively high refractive index. The high refractive index material may rapidly collect incident light and reduce an inclination angle of the image side surface of the first lens L1. Therefore, a manufacturing cost of the first lens L1 is reduced.

The second lens L2 has negative refractive power, and an image side surface of the second lens L2 is concave.

The third lens L3 has positive refractive power. The third lens is a spherical lens.

The fourth lens L4 has positive refractive power, and an image side surface of the fourth lens L4 is concave. The fourth lens L4 has a crescent shape.

The fifth lens L5 has negative refractive power. The image side surface and the object side surface of the fifth lens L5 are biconcave surfaces. The fifth lens L5 is a spherical lens.

The sixth lens L6 has positive refractive power. Each of the image side surface of the sixth lens L6 and the object side surface of the sixth lens is convex surface. The sixth lens L6 is a spherical lens.

The fifth lens L5 and the sixth lens L6 may be combined into a cemented lens. For example, the fifth lens L5 and the sixth lens L6 are combined by glue. The cemented lens has low color difference. The phenomenon of the purple edge is also reduced.

The seventh lens L7 has positive refractive power. The image side surface and the object side surface of the seventh lens L7 are biconvex surface. The seventh lens L7 is an aspherical lens.

One of the second lens L2 and the fourth lens L4 is an aspherical lens, and the other of the second lens L2 and the fourth lens L4 is a spherical lens. For example, the second lens L2 is an aspherical lens, and the fourth lens L4 is a spherical lens; or the second lens L2 is a spherical lens, and the fourth lens L4 is an aspherical lens.

The optical reflecting member 13 is disposed between the second lens L2 and the third lens L3.

The optical reflecting member 13 may be a planar mirror. The optical reflecting member 13 may be arranged inclined relative to the incident light to bend the optical path. Thus, the structure of the wide-angle lens is compact. The included angle between the incident light and a reflecting surface of the optical reflecting member 13 is set as needed. For example, the included angle is 45 degrees, so that the incident light coming from the second lens L2 to the optical reflecting member 13 is bent at 90 degrees. The incident light thus enters the first lens L3.

In the embodiment, the optical reflecting member 13 is a right-angle reflecting prism. The optical reflecting member 13 includes an incident surface 131, a reflecting surface 132, and an emitting surface 133. An incident light is bended by the reflecting surface 132 in 90 degrees to be emitted from the emitting surface 133.

Figure 2:
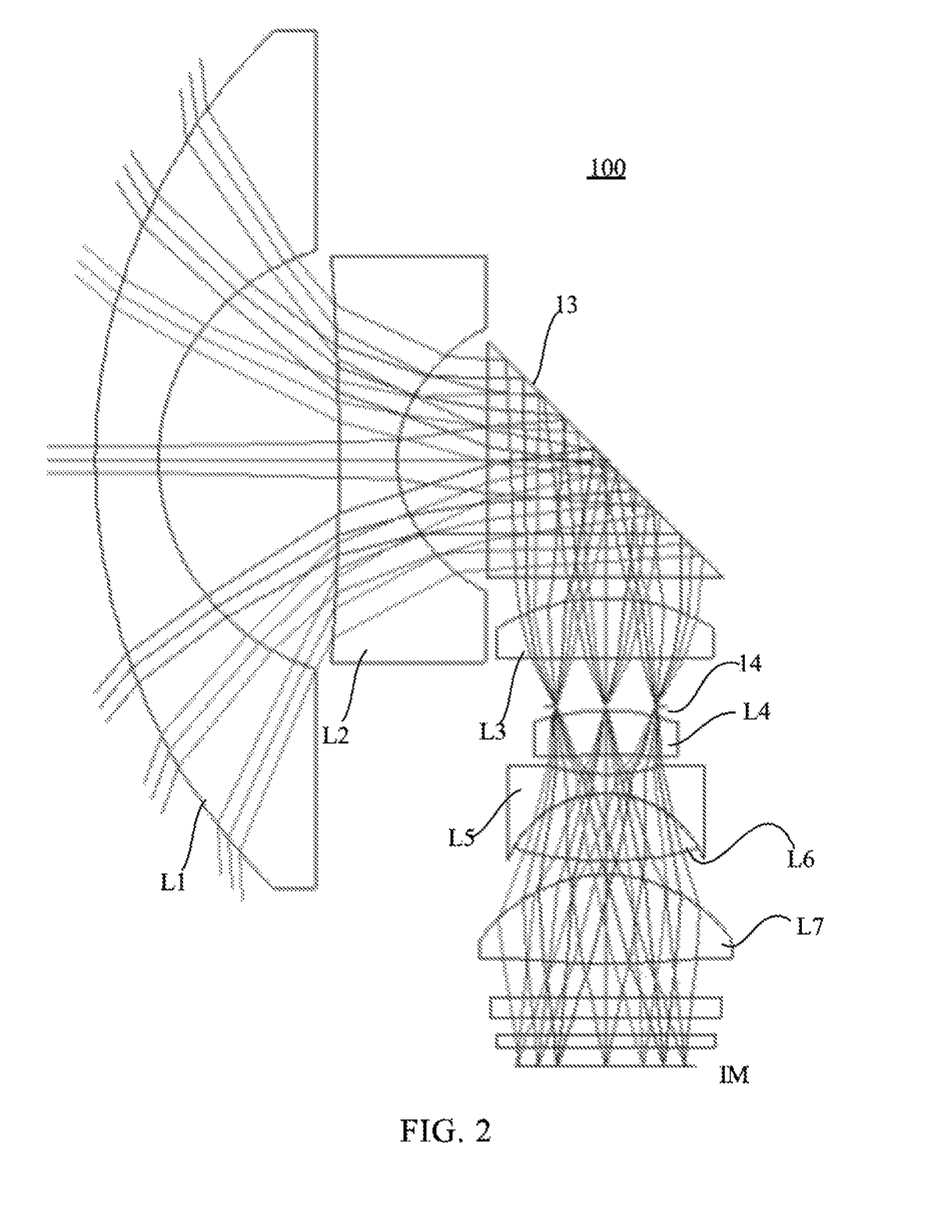
FIG. 2 illustrates a schematic view of an optical path of a wide-angle lens according to a first embodiment of the present disclosure.

FIG. 2 illustrates a schematic view of an optical path of a wide-angle lens 100. The optical reflecting member 13 is arranged behind the second lens L2. The optical path of the wide-angle lens 100 is bended in a predetermined degree (for example, 90 degrees). The total track length of the front optical path (from the first lens L1 to the center of the optical reflecting member 13) is greatly shortened. When two wide-angle lenses 100 are formed into a 360-degree panoramic imaging system (FIG. 13), the overall length between the first lens L1 of one wide-angle lens and the first lens L1 of the other wide-angle lens is shortened, and the requirements of the market on small size and thin lenses are met. For example, the total track length between the center of the first lens L1 to the center of the optical reflecting member 13 is less than 15 millimeters. The length between the first lens L1 of one wide-angle lens and the first lens L1 of the other wide-angle lens is smaller than 30 millimeters.

In conclusion, according to the wide-angle lens 100 provided by the embodiment, the lenses and the optical reflecting member are matched in a predetermined order, particularly, an aspherical lens is arranged in a predetermined location, so that the high-order aberration of the wide-angle lens can be effectively corrected. The field of view reaches more than 190 degrees. Furthermore, the wide-angle lens has small distortion and large target surface and the like. For example, the diagonal length of the target surface is larger than 4.5 millimeters.

All of the lenses of the wide-angle lens 100 (L1, L2, L3, L4, L5, L6, L7) may be glass lenses, so that the wide-angle lens 100 has small drift amount of the focal plane. The wide-angle lens 100 may be adapted in an ambient temperature with a good temperature control. The wide-angle lens 100 has relatively high service life and stability.

Furthermore, the wide-angle lens 100 may include an aperture stop 14. The aperture stop 14 is located between the third lens L3 and the fourth lens L4. The different positions of the aperture stop 14 may meet the CRA (chief ray angle) requirement of different imaging chips. The aperture stop 14 is used for accurately adjusting the light passing amount. In order to acquire a clear image in the dark, a large luminous flux is needed. The aperture stop 14 arranged between the third lens L3 and the fourth lens L4 is beneficial to control the incident angle of the main incident light reaching the image plane. An incident angle is effectively controlled within 12±3 degrees, thus the incident requirement for an imaging chip is met.

Furthermore, the wide-angle lens 100 may include an optical filter 15 or a filter group. A filter group is a combination of two or more optical filters. The optical filter 15 is arranged between the seventh lens L7 and the imaging plane IM. The optical filter 15 may be a visible light filter. In the embodiment, the optical filter with a thickness of 0.3 millimeters is used as an example, but it can be understood that the thickness of the optical filter 15 or the thickness of the filter group is not limited thereto. Non-working waveband light is inhibited by the optical filter 15. A chromatic aberration and stray light are effectively reduced; thus, an imaging effect is improved.

Furthermore, the wide-angle lens 100 may include a cover glass 16. The cover glass 16 is located between the optical filter 15 and the imaging plane IM.

Furthermore, to reduce the total track length of a panoramic imaging system and ensure that the panoramic imaging system has high imaging quality, the wide-angle lens 100 may satisfy the following condition:

$$3 < TL/f/h < 5;$$

where TL is an optical total track length of the wide-angle lens, f is a focal length of the wide-angle lens, and h is an image height corresponding to the total field of view of the wide-angle lens. Repeated tests show that when the value of the TL/f/h exceeds the upper limit, the total track length of the wide-angle lens is too long. If the total track length is shortened, the image height is insufficient. When the value of the TL/f/h exceeds the lower limit, due to the fact that the refractive power of each lens is too large, the aberration of the lens is difficult to correct, and the imaging capability is remarkably reduced. In other words, when the wide-angle lens 100 meets the conditional expression 3<TL/f/h<5, the imaging capability is good, and the image height is appropriate.

Furthermore, in order to provide a proper lens size for a good correction aberration, the wide-angle lens 100 may satisfy the following condition:

$$0.5 < \varphi 1234/\varphi < 1;$$

where $\varphi$ is a refractive power of the wide-angle lens 100, $\varphi 1234$ is a combined refractive power of the first lens L1, the second lens L2, the third lens 13, and the fourth lens L4. The four lenses (the first lens L1, the second lens L2, the third lens 13, the fourth lens L4) and the optical reflecting member 13 form a front lens group. The front lens group may be used for effectively converging wide-view-field angle incident light into the lens, and no large aberration is generated. When the value of $\varphi 1234/\varphi$ exceeds the upper limit, the refractive power of the front lens group is too high. Although the total track length of the whole lens may be reduced, the spherical aberration is too large to be corrected. When the value of $\varphi 1234/\varphi$ exceeds the lower limit, the refractive power of the front lens group is weakened. The spherical aberration is relatively reduced. However, the total track length of the whole lens is lengthened due to the decrease of the refractive power of the lens.

Furthermore, in order to provide a proper lens size for a good correction aberration, the wide-angle lens 100 may satisfy the following conditional expression:

$$0.1 < \varphi 567/\varphi < 0.5;$$

where, $\varphi$ is a refractive power of the wide-angle lens 100, $\varphi 567$ is a combined refractive power of the fifth lens L5, the sixth lens L6, and the seventh lens L7. The combined refractive power $\varphi 567$ may be in concert with the refractive power of the front lens group. The front lens group may be effectively matched with the fifth lens L5, the sixth lens L6, and the seventh lens L7, and the aberration may be therefore removed.

Furthermore, to correct the chromatic aberration, the wide-angle lens 100 may satisfy the following condition:

$$20 < |V_5 - V_6| < 50;$$

where $V_5$ is an Abbe number of the fifth lens L5, $V_6$ is an Abbe number of the sixth lens L6. When a value of $|V_5-V_6|$ is lower than the lower limit, the chromatic aberration is insufficient; when a value of $|V_5-V_6|$ is larger than the upper limit, the material is difficult to select.

Furthermore, to effectively correct the field curvature and distortion, the wide-angle lens 100 may satisfy the following condition:

$$-0.9 < (R_{12}+R_{13}+R_{14})/(|R_{12}|+|R_{13}|+|R_{14}|) < -0.3;$$

where, $R_{12}$ is a radius of curvature of an apex of the object side surface of the fifth lens L5, $R_{13}$ is a radius of curvature of a cemented surface of the cemented lens formed by the fifth lens L5 and the sixth lens L6, $R_{14}$ is a radius of curvature of the image side surface of the sixth lens L6. The relational expression defines the surface shape of the cemented lens (formed by the fifth lens L5 and the sixth lens L6). When the value of $(R_{12}+R_{13}+R_{14})/(|R_{12}|+|R_{13}|+|R_{14}|)$ exceeds the upper limit, the coma aberration may be reduced, but the astigmatism is difficult to correct, when $(R_{12}+R_{13}+R_{14})/(|R_{12}|+|R_{13}|+|R_{14}|)$ is lower than the lower limit, the aberration of the image is reduced, and the coma aberration is difficult to correct.

Furthermore, in order to reduce the influence of temperature on the image surface of the wide-angle lens, the wide-angle lens 100 may satisfy the following condition:

$$0 \times 10^{-6}/°C. < |(dn/dt)5 - (dn/dt)6| < 40 \times 10^{-6}/°C.;$$

$$(dn/dt)7 < -30 \times 10^{-6}/°C.;$$

where, (dn/dt)5 is a temperature refractive index coefficient of the material of the fifth lens L5, (dn/dt)6 is a temperature refractive index coefficient of the material of the sixth lens L6, (dn/dt)7 is a temperature refractive index coefficient of the material of the seventh lens L7. When the value of |(dn/dt)5−(dn/dt)6| or the value of (dn/dt)7 exceeds the limit range, the best focal surface will change in a large range when the ambient temperature change in a large range, and the use requirement cannot be met.

Furthermore, in order to reduce a color difference of the wide-angle lens 100, the seventh lens L7 may be made of a low dispersion material, and the wide-angle lens 100 may satisfy the following conditional expressions:

$$(nd/vd)7 < 0.03;$$

where (nd/vd)7 is a ration of a refractive index of the seventh lens L7 to an Abbe number of the seventh lens L7.

Furthermore, in order to limit the relation between the view angle and the size of the image surface, and to ensure the rationality of the cost and the imaging quality, the wide-angle lens 100 may satisfy the following condition:

$$1 < IH/\theta < 2;$$

where θ is a radian value of the half-view angle of the wide-angle lens, IH is an image height corresponding to the half-view field angle of the wide-angle lens. When the value of IH/θ is lower than the lower limit, the aberration correction is too difficult, and the number of the lenses needs to be increased. When the value of the IH/θ exceeds the upper limit, the aberration correction is good, but the cost will be increased. The number of the lenses should be reduced so that the cost can be reduced.

In order to make the wide-angle lens 100 further miniaturized and lightweight, the wide-angle lens 100 may satisfy the following condition:

$$0.1 < (CT_6 + CT_7)/TL < 0.2;$$

where $CT_6$ is a center thickness of the sixth lens L6, $CT_7$ is a center thickness of the seventh lens L7, TL is an optical total track length of the wide-angle lens 100. When ($CT_6$+$CT_7$)/TL is lower than the lower limit, the central thickness and the edge thickness of the sixth lens L6 and the seventh lens L7 are too thin, it is difficulty to produce the lenses and assemble the lenses. The reliability of the wide-angle lens in an actual drop experiment also can not be ensured. When ($CT_6$+$CT_7$)/TL exceeds the upper limit, the central thickness and the thickness of the edge of the sixth lens L6 and the seventh lens L7 are too thick. It is hard to guarantee a good image resolution for the small-size lens.

Furthermore, in order to define a shape of the fourth lens L4, ensure the image resolution, and eliminate the stray light, the wide-angle lens 100 may satisfy the following condition:

$$0.5 < f_4/r_{41} < 2;$$

where $f_4$ is a focal length of the fourth lens L4, and $r_{41}$ is a radius of curvature of the object side surface of the fourth lens L4. When the value of $f_4/r_{41}$ is lower than the lower limit, it is difficult to ensure the image resolution. When the value of $f_4/r_{41}$ exceeds the upper limit, a relatively serious ghost shadow phenomenon may appear.

Furthermore, in order to reduce a Brewster angle of the optical reflecting member 13, a material of a high-refractive index is used to make the optical reflecting member 13. The following condition can be satisfied:

$$1.92 < (nd)L;$$

where (nd)L is a refractive index of the material of the optical reflecting member 13. When a value of (nd)L is smaller than the lower limit, the angle of the Brewster angle of the optical reflecting member 13 is too large. A large Brewster angle leads that an incident angle of the light in the edge of the view field entering an incident surface of the optical reflecting member 13 is smaller than 14 degrees. The resolution of the wide-angle lens will be reduced.

Furthermore, the object side surface of the first lens L1 may be plated with a waterproof film, so that the wide-angle lens is protected and keep from scratching in use. An influence of a severe environment applied on the wide-angle lens also can be reduced.

Furthermore, a surface shape of the aspherical lens in the wide-angle lens 100 can both satisfy the following equation:

$$z = \frac{ch^2}{1 + \sqrt{1 - (1+K)c^2h^2}} + Bh^4 + Ch^6 + Dh^8 + Eh^{10},$$

where z is a distance from a curved surface to a vertex of the curved surface in the optical axis direction, c is a curvature of the vertex of the curved surface, and k is a coefficient of a secondary curved surface, h is a distance between the optical axis and the curved surface, and B, C, D, and E is respectively a four-order, six-order, eight-order, and ten-order curved surface coefficients.

All embodiments of the present disclosure provided in the following can be referred to the cross-section structure of the wide-angle lens illustrated in FIG. 1. In various embodiments of the disclosure, a thickness, a curvature radius and a material of each lens in the wide-angle lens are different. The specific value of the parameter is illustrated in each parameter table in each embodiment.

Table 1 below lists relative parameters of each lens of a wide-angle lens 100 according to a first embodiment.

TABLE 1

| Surface No. | Surface type | Curvature radius | Thickness | Refractive index | Abbe number |
|---|---|---|---|---|---|
| object surface | object surface | spherical | 1000 | 1000 | |
| S1 | the first lens | spherical | 14.945 | 1.562 | 1.806 | 40.9 |
| S2 | | | 5.37 | 4.458 | | |
| S3 | the second lens | aspherical | −36.73 | 1.415 | 1.743 | 49.3 |
| S4 | | | 3.028 | 2.23 | | |
| S5 | rectangle | spherical | infinity | 5.843 | 1.945 | 17.9 |
| S6 | reflecting prism | | infinity | 0.5 | | |
| S7 | the third lens | spherical | 5.18 | 1.482 | 1.903 | 31.3 |
| S8 | | | 148.568 | 1.187 | | |
| S9 | aperture stop | spherical | infinity | 0.1 | | |
| S10 | the fourth lens | spherical | 5.318 | 1.101 | 1.903 | 31.3 |
| S11 | | | 22.641 | 0.476 | | |
| S12 | the fifth lens | spherical | −4.609 | 0.48 | 1.805 | 25.4 |
| S13 | the sixth lens | spherical | 2.601 | 1.658 | 1.716 | 47.9 |
| S14 | | | −8.307 | 0.329 | | |
| S15 | the seventh lens | aspherical | 3.326 | 2.214 | 1.497 | 81.5 |
| S16 | | | −12.42 | 0.849 | | |
| S17 | filter | spherical | infinity | 0.3 | 1.517 | 64.2 |
| S18 | | | infinity | 0.4 | | |
| S19 | cover glass | spherical | infinity | 0.5 | 1.517 | 64.2 |
| S20 | | | infinity | 0.46 | | |
| S21 | image plane | spherical | infinity | 0 | | |

Table 2 below lists an aspheric parameter of the aspherical lenses of the wide-angle lens 100.

TABLE 2

| Surface No. | K | B | C | D | E |
| --- | --- | --- | --- | --- | --- |
| S3 | −1.35E+01 | 1.09E−03 | −9.33E−05 | 3.51E−06 | −4.82E−08 |
| S4 | −9.88E−01 | 2.58E−03 | 1.69E−04 | −5.10E−05 | 4.39E−06 |
| S15 | −2.87E−02 | −4.55E−03 | 2.20E−04 | −5.88E−05 | 2.80E−06 |
| S16 | 6.24E−01 | 3.92E−03 | 4.34E−04 | −1.69E−04 | 1.28E−05 |

Figure 3:
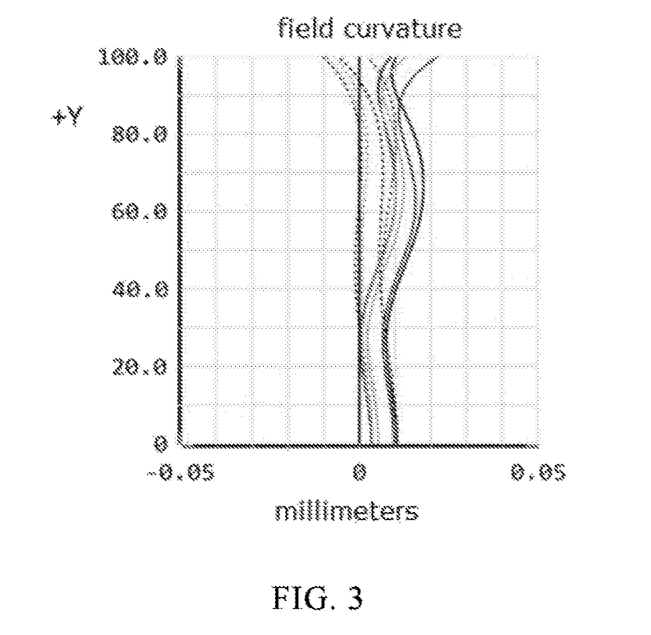
FIG. 3 illustrates a field curve graph of a wide-angle lens according to the first embodiment of the present disclosure.
Figure 4:
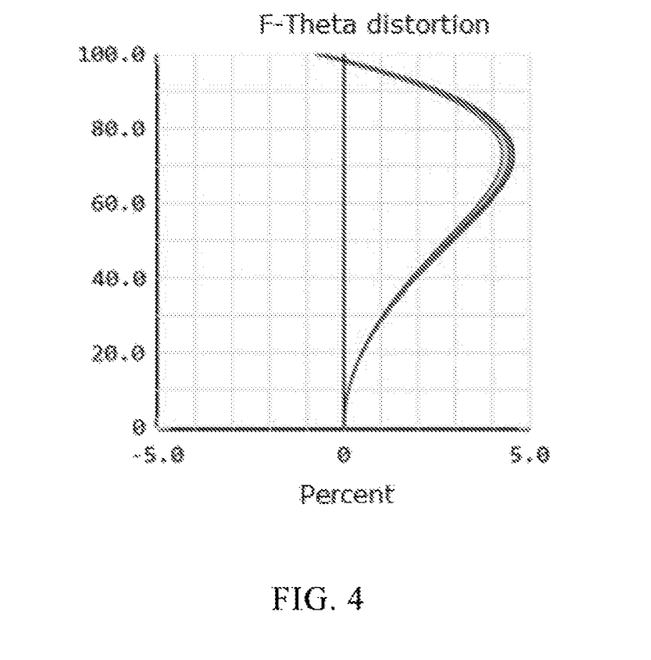
FIG. 4 illustrates a distortion curve chart of a wide-angle lens according to a first embodiment of the present disclosure.
Figure 5:
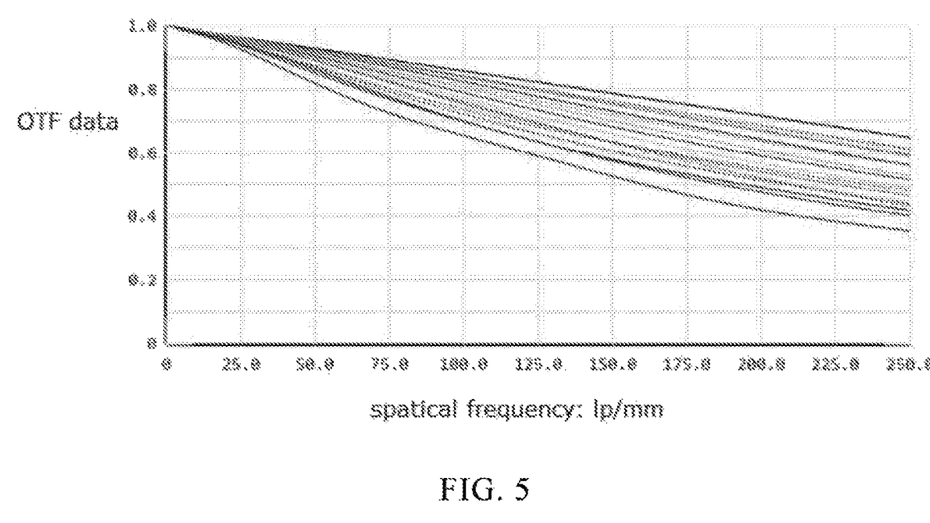
FIG. 5 illustrates an MTF curve of a wide-angle lens according to the first embodiment of the present disclosure.

A field curvature of the wide-angle lens 100 is illustrated in FIG. 3. An F-Theta distortion curve of the wide-angle lens 100 is illustrated in FIG. 4. According to FIG. 3 and FIG. 4, the field curvature, the F-Theta distortion, and a spherical aberration chromatic aberration on the axis are well corrected. FIG. 5 illustrates an MTF curve of the wide-angle lens 100. A good resolution and image resolving capability of the wide-angle lens 100 is embodied.

A Second Embodiment

Figure 6:
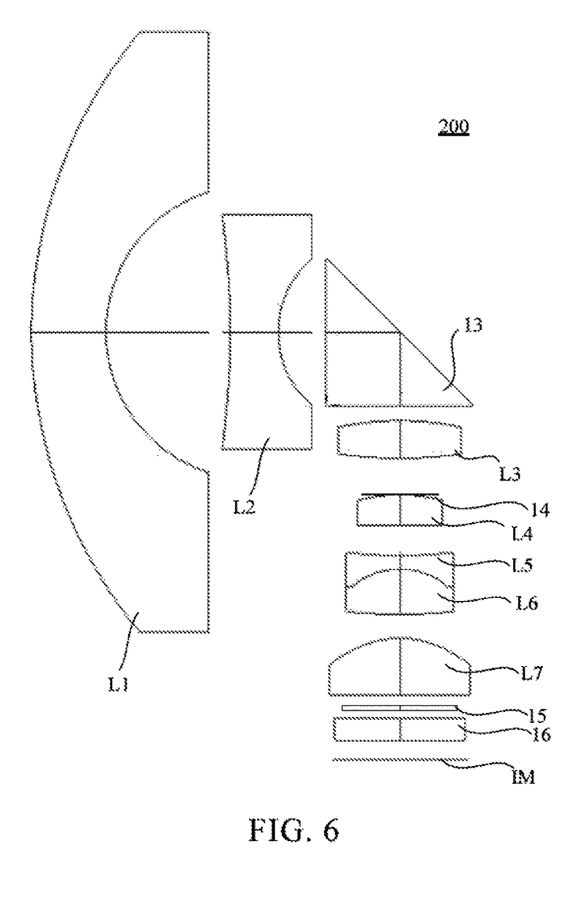
FIG. 6 illustrates a schematic structural diagram of a wide-angle lens according to a second embodiment of the present disclosure.

FIG. 6 illustrates a structural diagram of a wide-angle lens 200 provided by the embodiment. The wide-angle lens 200 is substantially the same as the wide-angle lens 100 in the first embodiment. However, the difference between the Abbe number of the fifth lens L5 and the sixth lens L6 in the wide-angle lens 200 is different from that of the wide-angle lens 100, and the compensation capability of the color difference is also different. A relative parameter of each lens of a wide-angle lens 200 are listed in Table 3.

TABLE 3

| Surface No. | Surface type | Curvature radius | Thickness | Refractive index | Abbe number |
| --- | --- | --- | --- | --- | --- |
| object surface | object surface | spherical | 1000 | 1000 | |
| S1 | the first lens | spherical | 16.467 | 2.6 | 1.945 | 17.9 |
| S2 | | | 5.152 | 4.378 | | |
| S3 | the second lens | aspherical | −19.238 | 1.652 | 1.743 | 49.3 |
| S4 | | | 3.442 | 1.66 | | |
| S5 | rectangle reflecting prism | spherical | infinity | 5.2 | 1.945 | 17.9 |
| S6 | | | infinity | 0.5 | | |
| S7 | the third lens | spherical | 10.419 | 1.313 | 1.922 | 20.8 |
| S8 | | | −16.341 | 1.287 | | |
| S9 | aperture stop | spherical | infinity | 0 | | |
| S10 | the fourth lens | spherical | 5.65 | 1.07 | 1.833 | 37.2 |
| S11 | | | 83.268 | 1.057 | | |
| S12 | the fifth lens | spherical | −14.545 | 0.48 | 1.945 | 17.9 |
| S13 | the sixth lens | spherical | 2.707 | 1.555 | 1.755 | 52.3 |
| S14 | | | −19.636 | 0.84 | | |
| S15 | the seventh lens | aspherical | 3.306 | 2.015 | 1.497 | 81.5 |
| S16 | | | −193.026 | 0.776 | | |
| S17 | filter | spherical | infinity | 0.3 | 1.517 | 64.2 |
| S18 | | | infinity | 0.3 | | |
| S19 | cover glass | spherical | infinity | 0.5 | 1.517 | 64.2 |
| S20 | | | infinity | 0.377 | | |
| S21 | image plane | spherical | infinity | 0 | | |

Table 4 below lists an aspheric parameter of the aspherical lenses of the wide-angle lens 200.

TABLE 4

| Surface No. | K | B | C | D | E |
| --- | --- | --- | --- | --- | --- |
| S3 | −9.87E+00 | 9.48E−04 | −7.06E−05 | 2.98E−06 | −4.80E−08 |
| S4 | −2.71E+00 | 9.74E−03 | −1.53E−04 | −1.49E−05 | 3.14E−06 |
| S15 | −9.42E−01 | −1.23E−03 | 2.64E−04 | −2.19E−05 | 1.39E−06 |
| S16 | −5.88E+01 | −6.81E−06 | 2.32E−04 | −2.87E−05 | 1.63E−06 |

Figure 7:
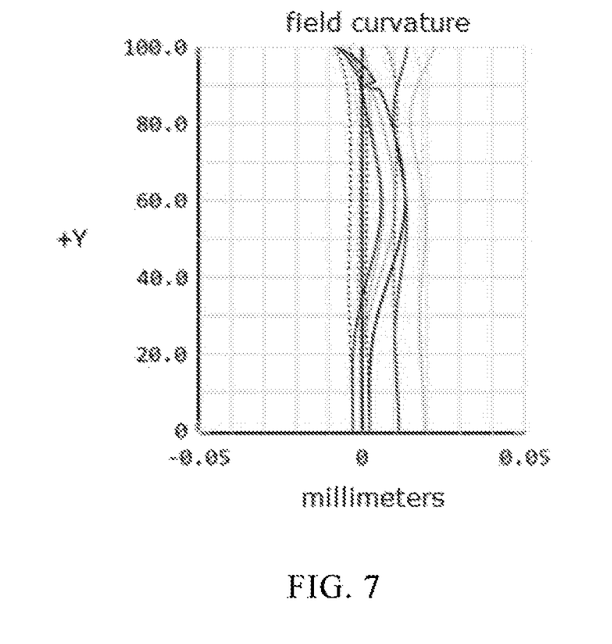
FIG. 7 illustrates a field curve graph of a wide-angle lens according to a second embodiment of the present disclosure.
Figure 8:
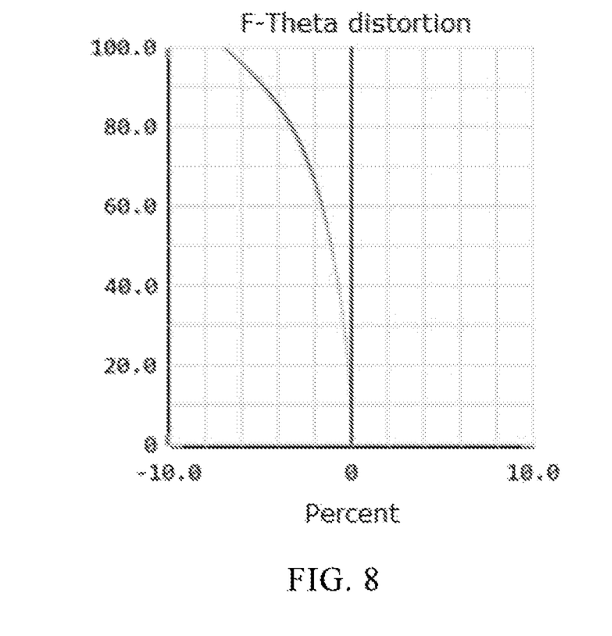
FIG. 8 illustrates a distortion curve chart of a wide-angle lens according to a second embodiment of the present disclosure.
Figure 9:
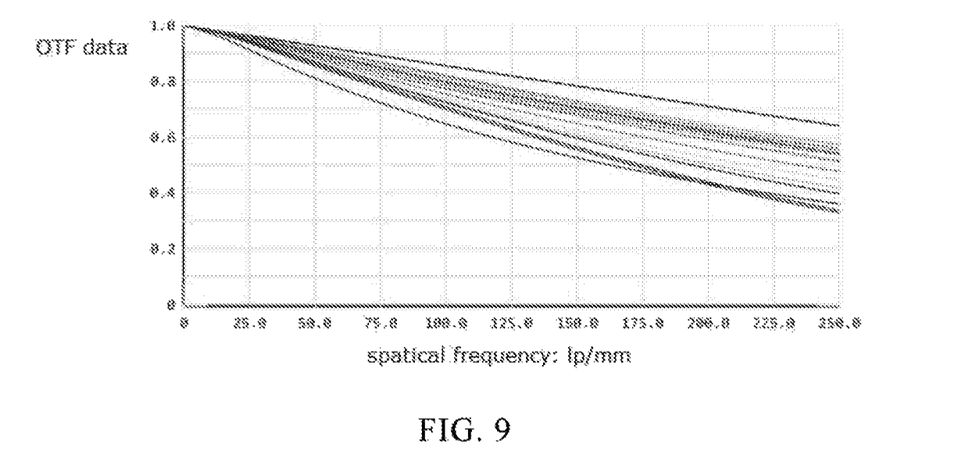
FIG. 9 illustrates an MTF curve of a wide-angle lens according to a second embodiment of the present disclosure.

A field curvature of the wide-angle lens 200 is illustrated in FIG. 7. An F-Theta distortion curve of the wide-angle lens 200 is illustrated in FIG. 8. According to FIG. 7 and FIG. 8, the field curvature and the F-Theta distortion are well corrected. FIG. 9 illustrates an MT curve of the wide-angle lens 200. A good resolution and image resolving capability of the wide-angle lens 200 is embodied.

The Third Embodiment

Figure 10:
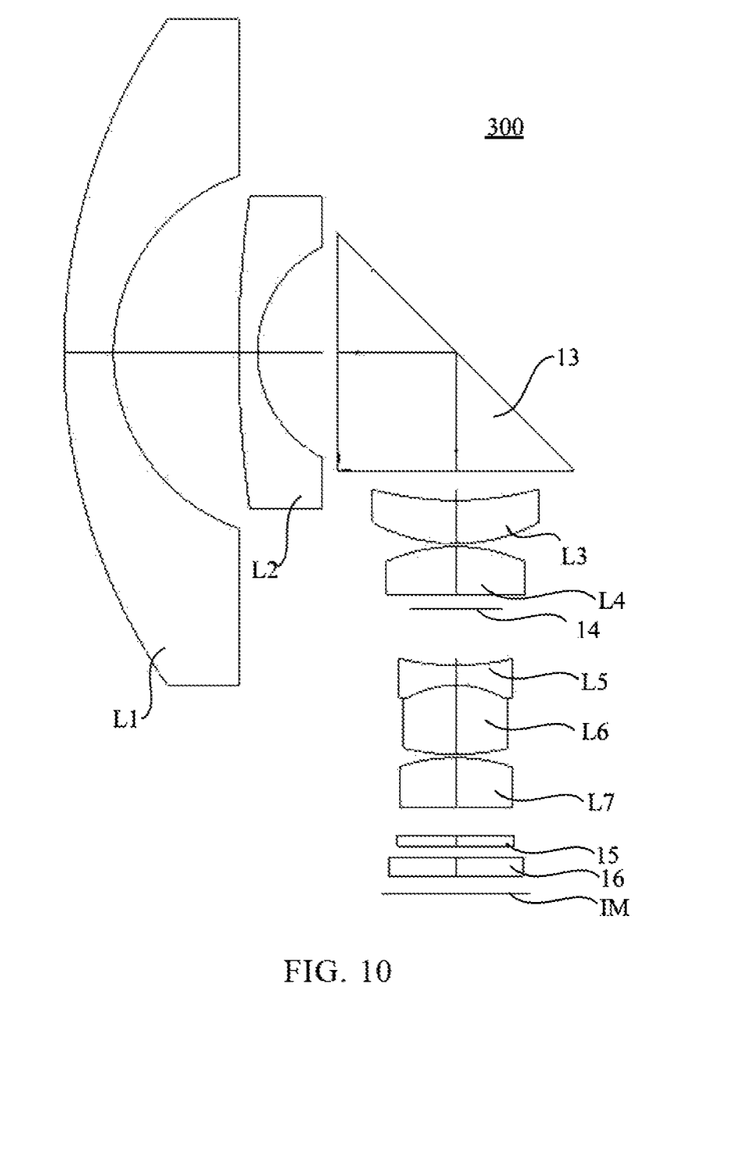
FIG. 10 illustrates a schematic structural diagram of a wide-angle lens according to a third embodiment of the present disclosure.

FIG. 10 illustrates a structural diagram of a wide-angle lens 300 provided by the embodiment. The wide-angle lens 300 is substantially the same as the wide-angle lens 100 in the first embodiment. However, the location of the aperture stop is different. The influence on the resolution and an incident angle of a main incident light is also different. In this embodiment, the aperture stop 14 is located between the fourth lens L4 and the fifth lens L5.

FIG. 5 below lists relative parameters of each lens of a wide-angle lens 300 according to the third embodiment.

TABLE 5

| Surface No. | Surface type | Curvature radius | Thickness | Refractive index | Abbe number |
|---|---|---|---|---|---|
| object surface | object surface | spherical | 1000 | 1000 | |
| S1 | the first lens | spherical | 16.246 | 1.377 | 1.755 | 52.3 |
| S2 | | | 5.17 | 3.484 | | |
| S3 | the second lens | spherical | 30.811 | 0.517 | 1.755 | 52.3 |
| S4 | | | 3.27 | 2.236 | | |
| S5 | rectangle reflecting prism | spherical | infinity | 6.457 | 1.922 | 20.8 |
| S6 | | | infinity | 0.833 | | |
| S7 | the third lens | spherical | −8.807 | 1.193 | 1.697 | 55.5 |
| S8 | | | −4.975 | 0.087 | | |
| S9 | the fourth lens | aspherical | 4.408 | 1.325 | 1.743 | 49.3 |
| S10 | | | 41.63 | 0.398 | | |
| S11 | aperture stop | spherical | infinity | 1.563 | | |
| S12 | the fifth lens | spherical | −6.997 | 0.554 | 1.805 | 25.5 |
| S13 | the sixth lens | spherical | 2.733 | 1.923 | 1.755 | 52.3 |
| S14 | | | −6.488 | 0.096 | | |
| S15 | the seventh lens | aspherical | 5.286 | 1.388 | 1.619 | 63.9 |
| S16 | | | −80.176 | 0.775 | | |
| S17 | filter | spherical | infinity | 0.3 | 1.517 | 64.2 |
| S18 | | | infinity | 0.3 | | |
| S19 | cover glass | spherical | infinity | 0.5 | 1.517 | 64.2 |
| S20 | | | infinity | 0.525 | | |
| S21 | image plane | spherical | infinity | 0 | | |

Table 6 below lists an aspheric parameter of the aspherical lenses of the wide-angle lens 300.

TABLE 6

| Surface No. | K | B | C | D | E |
|---|---|---|---|---|---|
| S9 | −7.28E−01 | 1.04E−03 | 9.09E−06 | 8.23E−06 | 9.81E−07 |
| S10 | 3.55E+01 | 9.40E−04 | −1.54E−04 | 5.54E−05 | −3.67E−06 |
| S15 | 4.25E−02 | −3.12E−03 | −2.29E−04 | −4.81E−05 | −3.43E−06 |
| S16 | 1.32E+01 | −8.73E−04 | −1.62E−04 | −8.35E−05 | 4.76E−06 |

Figure 11:
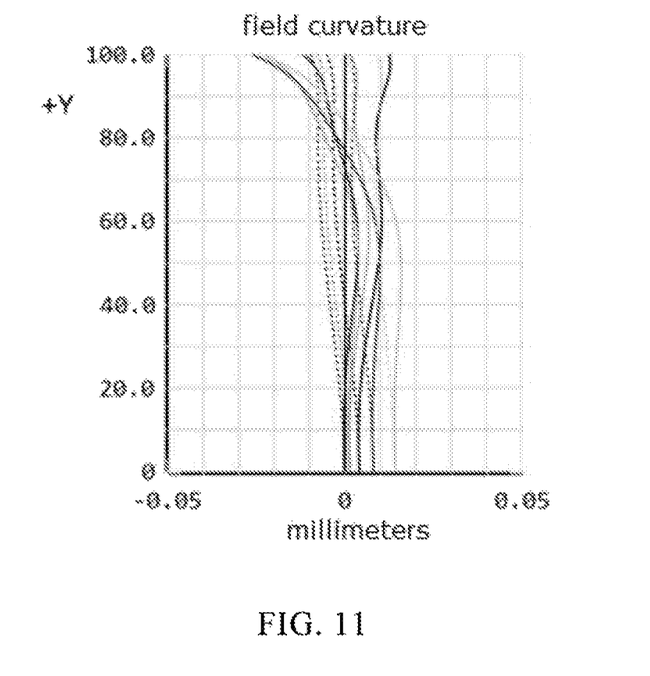
FIG. 11 illustrates a field curve graph of a wide-angle lens according to a third embodiment of the present disclosure.
Figure 12:
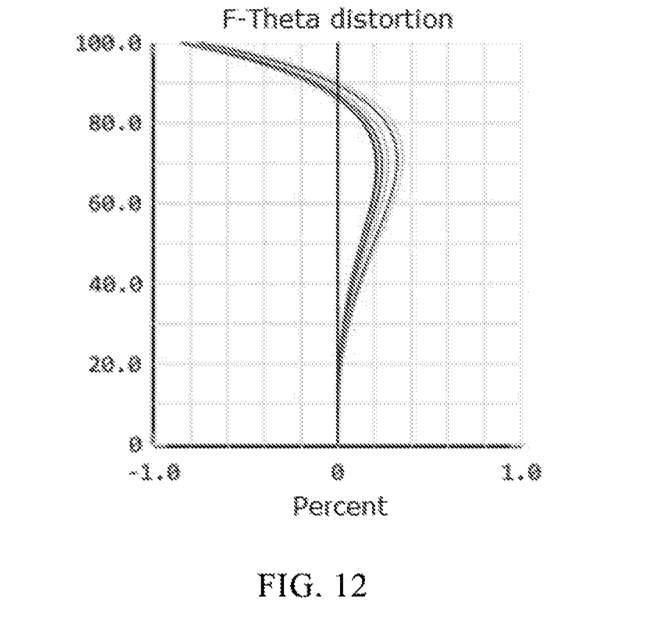
FIG. 12 illustrates a distortion curve chart of a wide-angle lens according to a third embodiment of the present disclosure.
Figure 13:
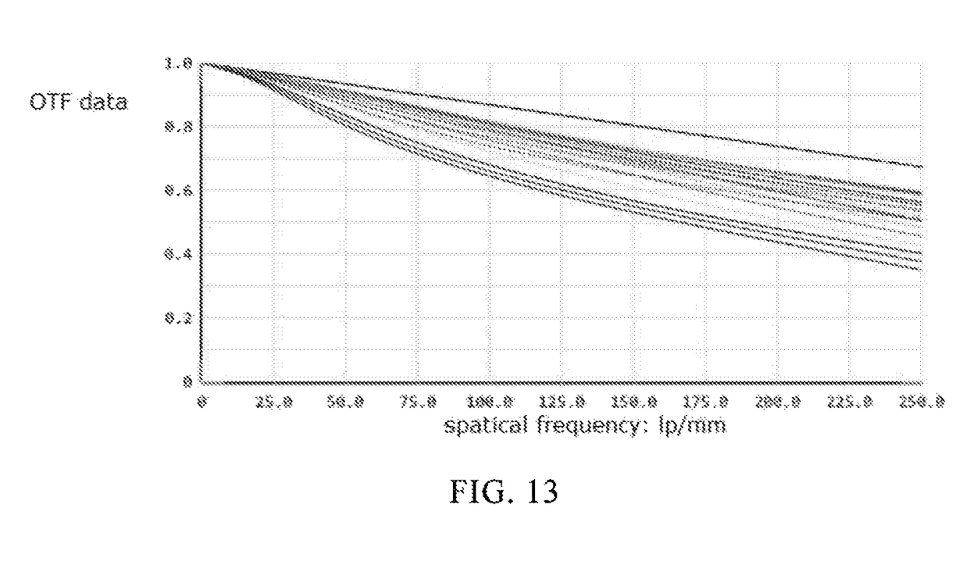
FIG. 13 illustrates an MTF curve of a wide-angle lens according to a third embodiment of the present disclosure.

A field curvature of the wide-angle lens 300 is illustrated in FIG. 11. An f-Theta distortion curve of the wide-angle lens 300 is illustrated in FIG. 12. According to FIG. 11 and FIG. 12, the field curvature and the f-Theta distortion are well corrected. FIG. 13 illustrates an MIT curve of the wide-angle lens 300. A good resolution and image resolving capability of the wide-angle lens 300 is embodied.

Table 7 below lists the lens data of the first embodiment, the second embodiment and the third embodiment, where f is a focal length of the system, F # is an F number, TL is an optical total track length, 2θ is field angle. The values of relevant conditional expressions are also listed.

TABLE 7

| conditional expression | the first embodiment | the second embodiment | the third embodiment |
|---|---|---|---|
| TL (mm) | 27.6 | 27.8 | 25.8 |
| F# | 2 | 2 | 1.8 |
| f (mm) | 1.325 | 1.429 | 1.344 |
| 2θ | 200° | 200° | 200° |
| TL/f/h | 4.46 | 4.13 | 4.08 |
| $\varphi_{1234}/\varphi$ | 0.855 | 0.923 | 0.747 |
| $\varphi_{567}/\varphi$ | 0.178 | 0.122 | 0.201 |
| $|V_5 - V_6|$ | 23 | 34.4 | 27 |
| $(R_{12} + R_{13} + R_{14})/(|R_{12}| + |R_{13}| + |R_{14}|)$ | −0.665 | −0.853 | −0.663 |
| $|(dn/dt)_5 - (dn/dt)_6|$ | $18 \times 10^{-6}$ | $1 \times 10^{-6}$ | $29 \times 10^{-6}$ |
| $(dn/dt)_7$ | $-66 \times 10^{-6}$ | $-66 \times 10^{-6}$ | $-32 \times 10^{-6}$ |
| $(nd/vd)_7$ | 0.018 | 0.018 | 0.026 |
| IH/θ | 1.339 | 1.336 | 1.341 |

TABLE 7-continued

| conditional expression | the first embodiment | the second embodiment | the third embodiment |
|---|---|---|---|
| $(CT_6 + CT_7)/TL$ | 0.14 | 0.13 | 0.13 |
| $(nd)L$ | 1.945 | 1.945 | 1.922 |
| $f_4/r_{41}$ | 1.68 | 0.67 | 1.48 |

The Fourth Embodiment

Figure 14:
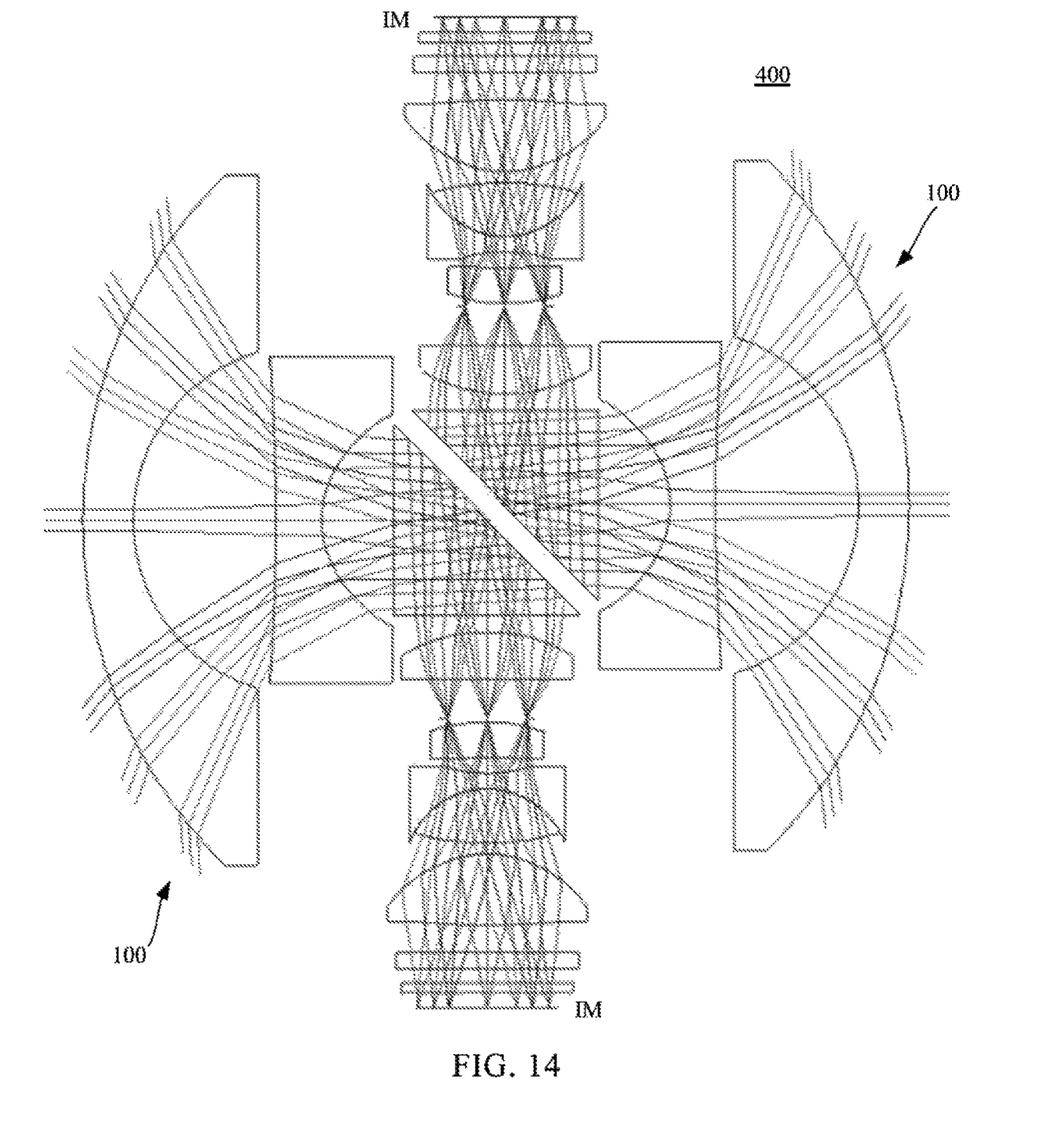
FIG. 14 illustrates a schematic structural diagram of a panoramic camera system according to a fourth embodiment of the present disclosure.

FIG. 14 illustrates a panoramic imaging system 400. The panoramic imaging system 400 includes two wide-angle lens 100, or two wide-angle lens 200, or two wide-angle lens 300. The two wide-angle lens 100 illustrated in the FIG. 14 are central symmetrically arranged about a center of the panoramic imaging system, and the image plane IM of the two wide-angle lenses 100 are central symmetrically arranged.

The panoramic imaging system 400 includes an optical reflecting member arranged after the second lens L2 to bend the optical path at 90 degrees. An optical total track length is largely reduced, as well as the total length of the panoramic imaging system 400. The requirement for small size and thin lenses is met. When a glass lens is matched with the optical reflecting member, the resolution is kept good and stable in a high temperature and low temperature, and the size of the panoramic imaging system 400 is maximized compacted. The cost and difficulty of producing the lenses is both reduced. The panoramic imaging system 400 also includes the same advantages embodied in the wide-angle lens 100.

While the present disclosure has been described in terms of what is presently considered to be the most practical and preferred embodiments, it is to be understood that the present disclosure needs not be limited to the disclosed embodiment. On the contrary, it is intended to cover various modifications and similar arrangements included within the spirit and scope of the appended claims which are to be accorded with the broadest interpretation to encompass all such modifications and similar structures.

What is claimed is:

1. A wide-angel lens, in the following order from an object side to an image plane, comprising:
   a first lens with negative refractive power, the first lens comprising a concave image side surface;
   a second lens with negative refractive power, the second lens comprising a concave image side surface;
   a third lens with positive refractive power;
   a fourth lens with positive refractive power, the fourth lens comprising a concave image side surface;
   a fifth lens with negative refractive power, the fifth lens comprising a concave object side surface and a concave image side surface;
   a sixth lens with positive refractive power, the sixth lens comprising a convex object side surface and a convex image side surface;
   a seventh lens with positive refractive power, the seventh lens comprising a convex object side surface and a convex image side surface, wherein each of the first lens and the third lens is a spherical lens, one of the second lens and the fourth lens is an aspherical lens, and the other one of the second lens and the fourth lens is a spherical lens, each of the fifth lens and the sixth lens is a spherical lens, and the fifth lens and the sixth lens form a cemented lens, the seventh lens is an aspherical lens;
   an optical reflecting member arranged between the second lens and the third lens; and
   an optical filter arranged between the seventh lens and the image side.

2. The wide-angle lens of claim 1, wherein the optical reflecting member is a rectangle reflecting prism or a planar mirror.

3. The wide-angle lens of claim 2, wherein the rectangle reflecting prism comprises an incident surface, a reflecting surface, and an emitting surface, an incident light entering the incident surface is bended by, the reflecting surface bends in 90 degrees to be emitted from the emitting surface.

4. The wide-angle lens of claim 1, further comprising an aperture stop, wherein the aperture stop is either arranged between the third lens and the fourth lens, or arranged between the fourth lens and the fifth lens.

5. The wide-angle lens of claim 1, wherein the wide-angle lens satisfies the following condition:

$$3 < TL/f/h < 5;$$

wherein, TL is an optical total track length of the wide-angle lens, f is a focal length of the wide-angle lens, and h is an image height corresponding to the total field of view of the wide-angle lens.

6. The wide-angle lens of claim 1, wherein the wide-angle lens satisfies the following conditions:

$$0.5 < \varphi 1234/\varphi < 1;$$

$$0.1 < \varphi 567/\varphi < 0.5;$$

wherein, $\varphi$ is a refractive power of the wide-angle lens, $\varphi 1234$ is a combined refractive power of the first lens, the second lens, the third lens, and the fourth lens, $\varphi 567$ is a combined refractive power of the fifth lens, the sixth lens, and the seventh lens.

7. The wide-angle lens of claim 1, wherein the wide-angle lens satisfies the following condition:

$$20 < |V5 - V6| < 50;$$

wherein, V5 is an Abbe number of the fifth lens, V6 is an Abbe number of the sixth lens.

8. The wide-angle lens of claim 1, wherein the fifth lens and the sixth lens form the cemented lens, the wide-angle lens satisfies the following condition:

$$-0.9 < (R12 + R13 + R14)/(|R12| + |R13| + |R14|) < -0.3;$$

wherein, R12 is a radius of curvature of an apex of the object side surface of the fifth lens, R13 is a radius of curvature of a cemented surface of the cemented lens formed by the fifth lens and the sixth lens, R14 is a radius of curvature of the image side surface of the sixth lens.

9. The wide-angle lens of claim 1, wherein the wide-angle lens satisfies the following conditions:

$$0 \times 10-6/° C. < |(dn/dt)5 - (dn/dt)6| < 40 \times 10-6/° C.;$$

$$(dn/dt)7 < -30 \times 10^{-6}/° C.;$$

wherein, (dn/dt)5 is a temperature refractive index coefficient of the fifth lens, (dn/dt)6 is a temperature refractive index coefficient of the sixth lens, (dn/dt)7 is a temperature refractive index coefficient of the seventh lens.

10. The wide-angle lens of claim 1, wherein the wide-angle lens satisfies the following condition:

$$(nd/vd)7 < 0.03;$$

wherein, the (nd/vd)7 is a ratio of a refractive index of the seventh lens to an Abbe number of the seventh lens.

11. The wide-angle lens of claim 1, wherein the wide-angle lens satisfies the following condition:

$$1 < IH/\theta < 2;$$

wherein, $\theta$ is a radian value of a half field of view of the wide-angle lens, IH is an image height corresponding to the half-view field angle of the wide-angle lens.

12. The wide-angle lens of claim 1, wherein the wide-angle lens satisfies the following condition:

$$0.1<(CT6+CT7)/TL<0.2;$$

wherein, CT6 is a center thickness of the sixth lens, CT7 is a center thickness of the seventh lens, TL is an optical total track length of the wide-angle lens.

13. The wide-angle lens of claim 1, wherein the wide-angle lens satisfies the following condition:

$$0.5<f4/r41<2;$$

wherein, f4 is a focal length of the fourth lens, r41 is a radius of curvature of the object side surface of the fourth lens.

14. The wide-angle lens of claim 1, wherein the wide-angle lens satisfies the following condition:

$$1.92<(nd)L;$$

wherein, (nd)L is a material refractive index of the optical reflecting member.

15. The wide-angle lens of claim 1, a length of an optical path from the first lens to the center of the optical reflecting member is less than 15 millimeters.

16. A panoramic imaging system, comprising two wide-angle lenses of claim 1, wherein the two wide-angle lenses are central symmetrically arranged about a center of the panoramic imaging system, and the image planes of the two wide-angle lenses are central symmetrically arranged.

17. The panoramic imaging system of claim 16, wherein the optical reflecting member is a rectangle reflecting prism, the rectangle reflecting prism comprises an incident surface, a reflecting surface, and an emitting surface, an incident light entering the incident surface is bended by the reflecting surface in 90 degrees to be emitted from the emitting surface.

18. The panoramic imaging system of claim 16, further comprising an aperture stop, wherein the aperture stop is either arranged between the third lens and the fourth lens, or arranged between the fourth lens and the fifth lens.

19. The panoramic imaging system of claim 16, wherein each of the wide-angle lenses satisfies the following condition:

$$3<TL/f/h<5;$$

wherein, TL is an optical total track length of the wide-angle lens, f is a focal length of the wide-angle lens, and h is an image height corresponding to the total field of view of the wide-angle lens.

20. The panoramic imaging system of claim 16, wherein each of the wide-angle lenses satisfies the following condition:

$$0.5<\varphi1234/\varphi<1;$$

$$0.1<\varphi567/\varphi<0.5;$$

wherein, $\varphi$ is a refractive power of the wide-angle lens, $\varphi1234$ is a combined refractive power of the first lens, the second lens, the third lens, and the fourth lens, $\varphi567$ is a combined refractive power of the fifth lens, the sixth lens, and the seventh lens.

* * * * *